Dec. 5, 1933.  W. L. AVERY  1,938,311
PRESSURE PRODUCING MEANS
Filed May 21, 1931  2 Sheets-Sheet 1
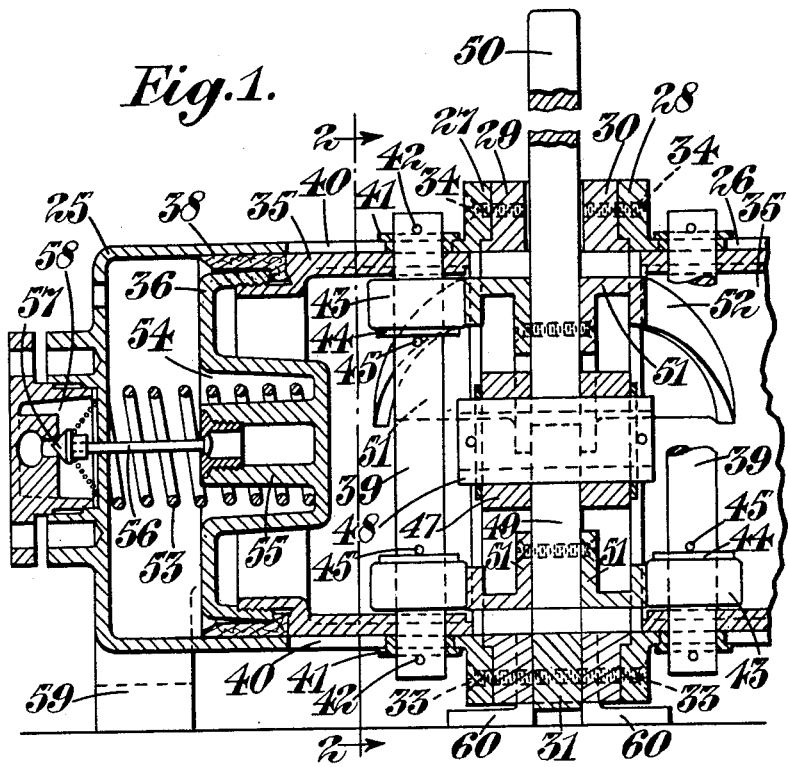
Fig.1.
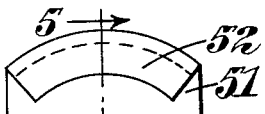
Fig.3.
Fig.2.  Fig.4.
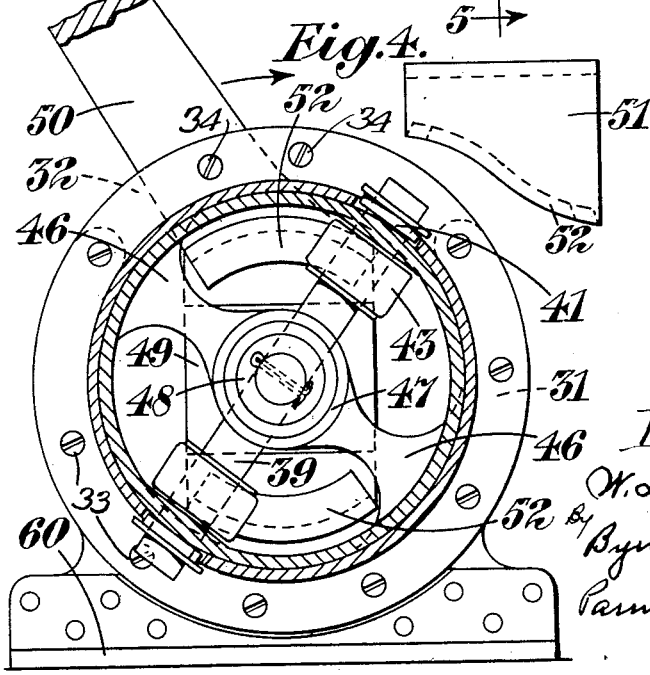
Inventor:
W. L. Avery,
By Byrnes, Stebbins,
Parmelee & Blenko,
attys.

Dec. 5, 1933.    W. L. AVERY    1,938,311
PRESSURE PRODUCING MEANS
Filed May 21, 1931    2 Sheets-Sheet 2
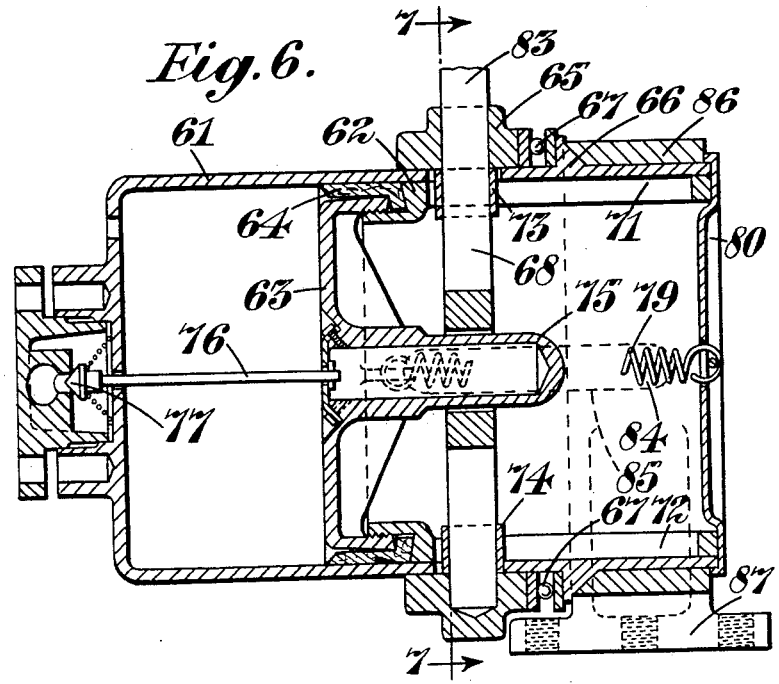
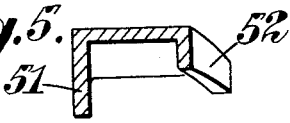
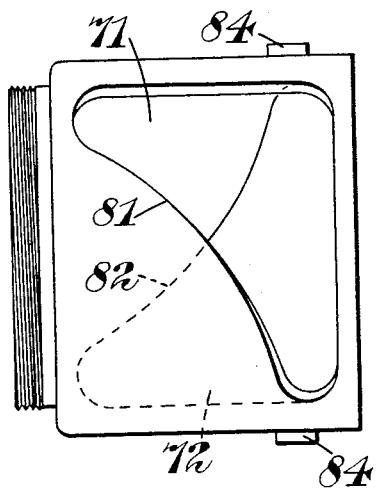
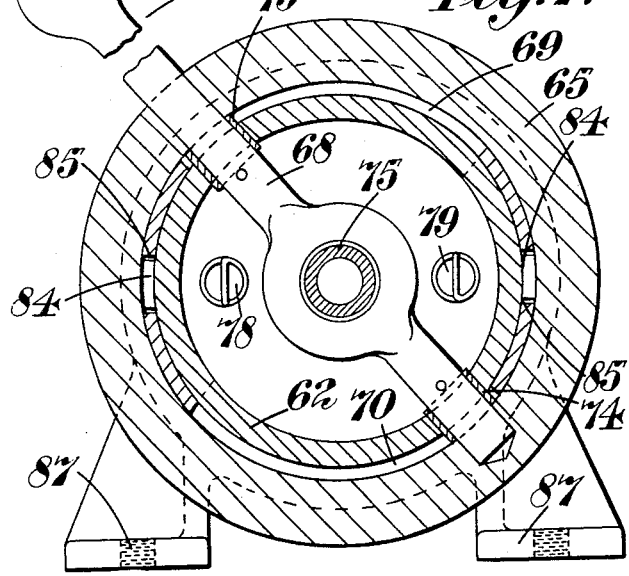
Inventor:
W. L. Avery,
By Byrnes, Stebbins,
Parmelee + Blenko,
attys.

Patented Dec. 5, 1933

1,938,311

UNITED STATES PATENT OFFICE 1,938,311

PRESSURE PRODUCING MEANS

William Leicester Avery, London, England, assignor to The India Rubber, Gutta Percha and Telegraph Works Company Limited, London, England, a British company Application May 21, 1931, Serial No. 539,106, and in Great Britain May 30, 1930

15 Claims. (Cl. 60—54.6)

This invention comprises improvements in or relating to apparatus for producing super-normal or sub-normal pressure in a fluid system for operating a brake or brakes, for example, a brake or brakes on the landing wheels of an aeroplane.

This invention relates to that type of such apparatus which comprises a chamber to contain fluid and means whereby the volume of the chamber may be increased to suck fluid into or reduced to expel fluid from the chamber through an orifice to the fluid system, the said increase or reduction of the volume of the chamber being effected by relative movement between two members of the apparatus (e. g. a cylinder and a piston), such movement being brought about by an operating lever having cam engagement with one of the relatively movable members. This is the type of apparatus that is hereafter and in the claims referred to as the type described.

According to this invention in apparatus of the type described for producing super-normal or sub-normal pressure in a fluid system for operating a brake or brakes the operating lever is mounted so as to be movable in relation to one of said members about an axis parallel to the direction in which relative movement between the members is required.

Preferably the operating lever is held against movement relatively to said member in a direction lengthwise of said axis.

Preferably one of the said members is a cylinder and the other a piston slidable therewithin, and the operating lever is movable about the axis of the cylinder (or about an extension of the said axis) but held against movement lengthwise of said axis.

Preferably the operating lever has, on each side of the cylinder axis, cam engagement with the piston or with parts carried thereby.

The accompanying drawings show two examples of apparatus according to this invention for producing super-normal pressure for operating a brake or brakes.

Figure 1 is a part longitudinal sectional view of one form of apparatus according to this invention, the apparatus in this case being double.

Figure 2 is a sectional view on the line 2—2 of Figure 1.

Figure 3 is an elevation of the cam member incorporated in the apparatus of Figures 1 and 2.

Figure 4 is a plan view of the cam member of Figure 3.

Figure 5 is a sectional view of the cam member on the line 5—5 of Figure 3.

Figure 6 is a longitudinal sectional view of a second form of apparatus according to this invention.

Figure 7 is a sectional view on the line 7—7 of Figure 6.

Figure 8 is an external view of the piston incorporated in the apparatus shown in Figures 6 and 7 looking from above in Figure 6.

Referring to Figures 1 to 5 the apparatus shown therein is double, that is to say there are two chambers the volumes of which are, by the movement of a single lever, simultaneously reduced to expel fluid from the chambers to one or more fluid systems. Only one side and the central portion of the apparatus is shown in Figure 1, the other side of the apparatus being identical in construction and arrangement with that shown.

The apparatus comprises a pair of cylinders 25 and 26, each having one closed end and being secured together at their open ends. The cylinders have radial flanges 27 and 28 at their open ends, which respectively abut rings 29 and 30 between which is a spacing member 31 of generally arcuate shape. The member 31 extends over halfway round the circumference of the rings 29 and 30, leaving between said rings around the remainder of the circumference a slot 32. Screws 33 pass through the flanges 27 and 28 and the rings 29 and 30 into the member 31 thus securing the cylinders together. On either side of the slot 32 screws 34 pass through the flanges 27 and 28 into the rings 29 and 30 respectively.

Within each cylinder is a piston 35 having a screwed-on cap 36 securing a fluid tight packing washer 38. Extending diametrically across the rearward end of each piston is a gudgeon pin 39 the ends of which extend through the skirts of the piston and through slots 40 located in the cylinder walls parallel with the axis of the cylinders. Where the gudgeon pin ends pass through the cylinder walls they are furnished with freely rotatable bushings 41 which are retained by pins 42. Upon each end of each gudgeon pin within its piston is mounted a freely rotatable roller 43 which is retained in position by means of a washer 44 and pin 45. The inner surface of the piston skirts adjacent the side of each roller is suitably thickened so as to afford flat faces for the sides of the rollers to bear against.

The rings 29 and 30 each have two diametrically opposite radial webs 46 which support, centrally within the rings, spindle receiving bosses 47 which are bored co-axially with the cylinders rotatably to receive through and between them a hollow spindle 48. Centrally mounted upon the spindle 48 between the bosses 47 is a rectangular plate 49 which is formed integrally with a lever 50 which extends upwardly through the slot 32. To each side of the plate 49 are secured two arcuate cam members 51 which have cam surfaces 52 which engage the rollers 43 on the gudgeon pins 39. The cam members 51 secured to that side of the plate 49 which is toward the cylinder 26 are shown in detail in Figures 3–5, those secured to the other side of the plate only differing therefrom in that their cam surfaces slope in the opposite direction. The webs 46 are so located that the cam members 51 extend through the spaces between them (see Figure 2).

It will be appreciated that angular movement of the lever 50 in the direction indicated by the arrow in Figure 2 will thrust the pistons 35 away from one another, that is, forwardly in the cylinders. The shape of the cam surfaces 52 is such that the leverage of the lever on the piston increases as the piston moves forwardly in the cylinder.

Normally urging each piston rearwardly is a compression spring 53 which extends from the closed end of the cylinder to the piston. Each piston cap has an annular cavity 54 which receives the end of the spring 53, the central boss 55 which the spring surrounds being hollow to receive the end of the stem 56 of a fluid supply valve 57 which is located within a recess 58 in the end of the cylinder. The fluid supply valve 57 is arranged so as to be lifted from its seating to establish communication between the fluid supply and the cylinder when the piston reaches or approximates its extreme rearward position in the cylinder, as described in the co-pending U. S. application Serial No. 424,588. For the purpose of securing the apparatus to a frame member of a vehicle or to some other support it is provided with feet 59 at the distant ends of the cylinders and feet 60 centrally. The feet 60 comprise angle members which are secured to either side of portions extending integrally from the spacing member 31.

Referring now to Figures 6 to 8 the apparatus shown therein comprises a cylinder 61 having slidable therewithin a piston 62 having a screwed on cap 63 which grips a fluid tight packing washer 64. Encircling the cylinder is a ring 65 which is movable rotationally around the cylinder. Between the ring 65 and a circumferential shoulder 66 formed integrally on the exterior of the cylinder 61 on the rearward side of the ring 65 relatively to the movement of the piston is a ball thrust ring 67.

Extending diametrically across the ring 65 and across the cylinder 61 is a rod 68 the said rod passing through circumferentially extending slots 69 and 70 in the cylinder walls and through apertures 71 and 72 in the piston skirt. Where the rod 68 passes through the said slots and apertures it carries freely rotatable bushings 73 and 74. Centrally of the cylinder the rod is enlarged and is bored co-axially of the cylinder freely to embrace a hollow closed projection 75 which extends rearwardly from the centre of the piston cap 63. The projection 75 accommodates the stem 76 of the spring urged fluid supply valve 77 when the piston moves forwardly in the cylinder. The fluid supply valve is similar in arrangement and operation to that incorporated in the apparatus of Figures 1 to 5. Tension springs 78 and 79 normally urge the piston to its extreme rearward location in the cylinder, the said springs extending between lugs formed on the rear of the piston cap 63 and a cover plate 80 which closes the rear end of the cylinder.

The apertures 71 and 72 in the piston skirt are shaped as shown in Figure 8, the sides 81, 82 of said apertures forming cam surfaces which are engaged by the rod 68. The rod 68 is extended at one end through the ring 65 to provide a hand lever 83 by which rotational movement may be imparted to the ring 65. It will be appreciated that rotational movement of the ring in the direction of the arrow in Figure 7 will result in forward movement of the piston through the engagement of the rod 68 with the cam surfaces 81, 82.

The sides 81 and 82 of the apertures 71 and 72 are so shaped that the leverage of the lever on the piston increases as the piston moves forward in the cylinder.

Extending laterally from opposite sides of the skirt of the piston 62 near its rearward end are projections 84 which enter slots 85 in the cylinder wall, the said slots running parallel with the axis of the cylinder. The said projections prevent rotation of the piston in the cylinder.

Secured around the rear end of the cylinder is a ring 86 having feet 87 extending therefrom by which the apparatus may be secured to a frame member of the vehicle upon which it is carried, or to any other suitable support.

Where the apparatus has a hand operated lever and a fluid supply which automatically replenishes any loss of fluid in the chamber (as is the case in the two forms of apparatus described) it is not desirable that the movement of the hand lever, in the opposite direction to that which effects a forward movement of the piston, should positively effect a retraction of the piston, as if it did do so, and the lever was rapidly moved in the said direction by the operator, there would be a likelihood of excess fluid being drawn into the chamber and the fluid system connected thereto, which might result in a permanent application of the brakes. To this end the cam engagement between the lever and the piston or pistons in the apparatus of Figures 1 to 5 and in that of Figures 6 to 8 is operative in one direction of movement of the lever only, i. e., to effect the forward movement of the piston or pistons in the cylinder or cylinders. In the case of the apparatus of Figures 6 to 8 the triangular shape of the apertures in the piston renders the cam engagement operative in one direction of movement of the lever only. In each case the movement of the lever in the opposite direction to that which effects forward movement of the piston or pistons permits the retraction of the piston or pistons by the springs and pressure of the fluid.

The apparatus could have a foot operated lever instead of a hand operated lever, in which case there would be no need to make the cam engagement operative in one direction only, as the operator could with his foot move the lever positively in one direction only.

With each construction of apparatus described a comparatively high fluid pressure can be obtained in a fluid system for operating a brake or brakes with comparatively small movement of the lever and without excessive pressure being applied thereto. This is particularly due to the fact that the leverage of the lever in relation to the movement of the piston increases as the piston moves forwardly in the cylinder. Further, the size of the cylinder and its associated parts can be comparatively small and thus render the apparatus particularly suitable for uses such as operating brakes on aircraft wheels.

I claim:—

1. Apparatus for producing super-normal or sub-normal pressure in a fluid system for operating brakes, comprising a cylinder, a piston slidable therewithin, and an operating lever movable about the axis of the cylinder but held against movement lengthwise of the said axis, and having on each side of the cylinder axis engagement with cam surfaces movable with the skirt of the piston.

2. Apparatus for producing super-normal or sub-normal pressure in a fluid system for operating brakes, comprising a cylinder, a piston slidable therewithin, and an operating lever movable about the axis of the cylinder but held against movement lengthwise of said axis, passing through an aperture in the skirt of the piston on each side of the cylinder axis and having cam engagement with a cam surface afforded by the side of each such aperture.

3. Apparatus for producing super-normal or sub-normal pressure in a fluid system for operating brakes comprising a cylinder, a piston slidable therewithin and a ring which is co-axially and rotatably mounted around the cylinder and carries a rod extending diametrically across the cylinder through slots in the walls thereof and engaging cam surfaces provided by a part movable with the piston.

4. Apparatus for producing super-normal or sub-normal pressure in a fluid system for operating brakes comprising a cylinder and two members, one of which is a piston slidable within the cylinder and the other of which is an operating lever extending transversely to and movable about the axis of the cylinder without moving lengthwise of said axis, one of said members having cam surfaces and the other of said members having rods radial to the axis carrying rollers co-operating with said cam surfaces.

5. Apparatus for producing super-normal or sub-normal pressure in a fluid system for operating brakes comprising a cylinder and two members, one of which is a piston slidable within the cylinder and the other of which is an operating lever extending transversely to and movable about the axis of the cylinder without moving lengthwise of said axis, one of said members being provided with cams afforded by sections of a tube and the other of said members having rollers co-operating therewith.

6. Apparatus for producing super-normal or sub-normal pressure in a fluid system for operating brakes comprising a cylinder and two members, one of which is a piston slidable within the cylinder and the other of which is an operating lever extending transversely to and movable about the axis of the cylinder without moving lengthwise of said axis, one of said members having cam surfaces with which the other co-operates and which are of distorted helical form whereof the inclination to the axis at the point of engagement increases as the operating member is operated.

7. Apparatus for producing super-normal or sub-normal pressure in a fluid system for operating brakes comprising two relatively movable members, the relative movement between which increases or reduces the effective volume of the chamber to suck in or expel fluid, and an operating lever for operation by hand which is mounted so as to be movable in relation to at least one of said members about an axis parallel to the direction in which relative movement between the members is required and which extends transversely to that axis, and having cam engagement with at least one of said members such that relative movement in one direction positively produces relative movement between the two members while movement in the opposite direction is free to occur without producing such relative movement between the members.

8. Apparatus for producing super-normal or sub-normal pressure in a fluid system for operating brakes, comprising a chamber to contain fluid, two relatively movable members relative movement between which increases or reduces the effective volume of the chamber to suck in or expel fluid and an operating lever which has cam engagement with at least one of said members is mounted so as to be movable in relation to at least one of said members about an axis parallel to the direction in which relative movement between the members is required and which extends transversely to said axis, and anti-friction means associated with at least one of the surfaces between which cam engagement occurs.

9. Apparatus for producing supernormal or subnormal pressure in a fluid system for operating brakes comprising in combination a cylinder and two members, one of which is a piston slidable within the cylinder and having a part extending from the piston-head in an axial direction, and the other of which is an operating lever extending transversely to and movable about the axis of the cylinder without moving lengthwise of said axis, one of said members having cam surfaces and the other of said members having parts to engage said surfaces, parts at least of the engageable portions of the cam surfaces being disposed axially within the length of the piston-head extension.

10. Apparatus for producing supernormal or subnormal pressure in a fluid system for operating brakes, comprising a cylinder, a piston slidable therewithin, a gudgeon-pin carried by the piston and disposed transversely to the axis thereof, an operating lever extending transversely to and movable about the axis of the cylinder but held against movement lengthwise of said axis, and cam-surfaces that are carried by said operating lever on each side of the cylinder axis and engage the gudgeon-pin.

11. Apparatus for producing supernormal or subnormal pressure in a fluid system for operating brakes, comprising a cylinder, a piston slidable therewithin, a gudgeon-pin carried by the piston and disposed transversely to the axis thereof, rollers thereon, an operating lever extending transversely to and movable about the axis of the cylinder but held against movement lengthwise of said axis, and cam-surfaces that are carried by said operating lever on each side of the cylinder axis and engage the gudgeon-pin rollers.

12. Apparatus for producing supernormal or subnormal pressure in a fluid system for operating brakes, comprising a cylinder having a slot in the wall, a piston slidable within said cylinder and having a part movable with the piston, a ring coaxially and rotatably mounted around the cylinder and having at least one abutment extending through the slot in the wall of the cylinder, and interengaging portions afforded on said abutment and on said part that is movable with the piston, one at least of which portions affords a cam whereby rotational movement of the ring effects endwise movement of the piston in the cylinder.

13. Apparatus for producing supernormal or subnormal pressure in a fluid system for operating brakes, comprising a cylinder having a circumferential slot in the wall thereof, a piston slidable within said cylinder, a ring coaxially and rotatably mounted around the cylinder and having at least one abutment extending through said circumferential slot in the wall of the cylinder, said slot affording a cam-surface to cooperate with said abutment whereby rotational movement of the ring effects endwise movement of the piston in the cylinder.

14. Apparatus for producing supernormal or subnormal pressure in a fluid system for operating brakes, comprising two cylinders disposed end to end in axial alignment, a piston slidable within each cylinder and having a part movable with the piston, an operating lever movable about an axis parallel to that of the cylinders, and interengaging portions afforded on said operating lever and on said parts that are movable with said pistons, one at least of which portions for each piston is a cam, whereby the pistons are movable simultaneously in opposite directions on movement of the operating lever about its axis.

15. Apparatus for producing supernormal or subnormal pressure in a fluid system for operating brakes, comprising in combination a cylinder, a piston slidable therewithin and comprising a piston head and a skirt portion extending therefrom, an operating lever extending transversely to and movable about the axis of the piston but held against movement lengthwise of said axis, and interengaging portions afforded on said operating lever and on the piston, one at least of which portions comprises a cam and one of which portions is at least in part situated axially within the skirt of the piston.

WILLIAM LEICESTER AVERY.